Feb. 22, 1949.   C. P. BERGMAN   2,462,063
GUIDE MEANS FOR ROTARY OSCILLATING PISTONS
OF EXPANSIBLE CHAMBER METERS
Filed July 26, 1944
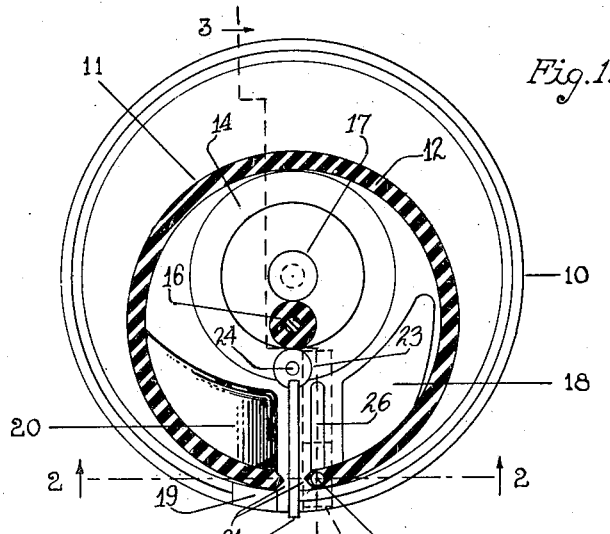
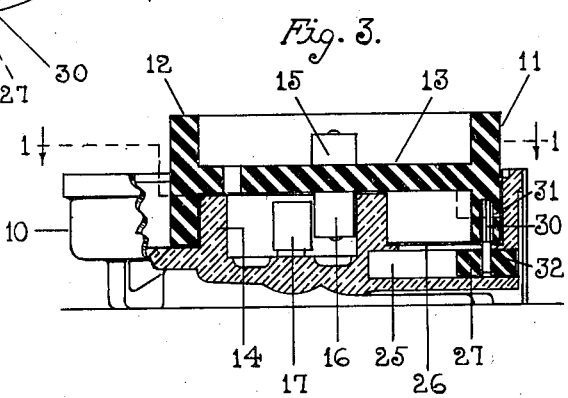
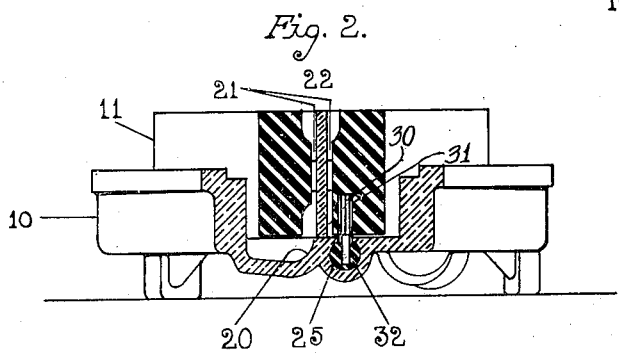
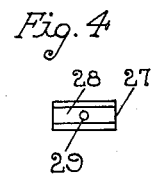
INVENTOR.
CHARLES P. BERGMAN
BY
ATTORNEYS Patented Feb. 22, 1949

2,462,063

UNITED STATES PATENT OFFICE 2,462,063

GUIDE MEANS FOR ROTARY OSCILLATING PISTONS OF EXPANSIBLE CHAMBER METERS

Charles P. Bergman, Brooklyn, N. Y., assignor to Rockwell Manufacturing Company, a corporation of Pennsylvania Application July 26, 1944, Serial No. 546,606

13 Claims. (Cl. 121—68)

1

This invention relates to fluid flow meters and more particularly to a meter of the oscillating piston type, such as that disclosed in the patent of Alexander R. Whittaker, No. 2,338,152, issued January 4, 1944.

It is the primary object and purpose of the present invention to provide means for more accurately controlling the oscillating motion of the piston in such a meter so as to obtain practically noiseless operation thereof, with a minimum of wear of the coacting parts of the control means, and an appreciable increase in the efficiently functioning life of the meter In the patented meter above-mentioned there is provided a fixed partition or division plate disposed radially of the measuring chamber between the inlet and outlet ports and with respect to which the piston oscillates. A roller carried by the piston and traveling in a guideway on the wall of the piston chamber or casing controls the path of oscillating motion of the piston and maintains a clearance relation between the piston wall and division plate to eliminate noise and frictional resistance to the movement of the piston.

While this device functions satisfactorily for a while, after a short period of use excessive wear of the roller and its supporting pin, in comparison with the other parts of the meter, may result in uncontrolled relative motion between the piston and division plate sufficient to seriously impair the efficient silent operation of the meter.

The present invention provides means for overcoming the above difficulty, and in one embodiment thereof a pilot or guide member for the piston is slidably supported in a guideway independently of the piston, and is connected with the latter by a small diameter pivot pin having a minimum of turning or pivotal movement in the oscillating motion of the piston. Thus, excessive frictional pivot wear is eliminated and maximum operating efficiency assured.

A more particular object of the invention is to provide a pilot member mounted for reciprocatory movement in a bore formed in the base of the measuring chamber or casing and with which the meter piston has a separable pivotal connection.

An additional object of the invention is to pro-

2 vide a guide member for the oscillatory meter piston which will assure sustained quiet operation of the meter and in which the several parts may be easily and quickly assembled and said guide member readily removed and replaced whenever required.

It is an important object of the invention to provide a novel fluid meter wherein the movement of an oscillating piston is piloted by a guide member that reciprocates on its axis in a direction substantially normal to the axis of oscillation of the meter piston.

With the above and other subordinate objects in view, the invention consists in improved control means for fluid meters and in the construction and relative arrangement of its several parts, as will be hereinafter more fully described and subsequently defined in the subjoined claims.

In the drawing, wherein I have disclosed one simple and practical embodiment of the invention and in which similar reference characters designate corresponding parts throughout the several views:

Figure 1 is a plan view with certain parts shown in section as indicated by the line 1—1 in Figure 3;

Figure 2 is a vertical sectional view taken substantially on the line 2—2 of Figure 1;

Figure 3 is a vertical sectional view taken substantially on the line 3—3 of Figure 1; and Figure 4 is a detail plan view of the guide member.

Referring in greater detail to the drawings, for the purpose of the present explanation, I have shown only the base section 10 of the measuring chamber within which the oscillating piston 11 is contained. In a meter for delivering water in measured quantities, the piston 11 is preferably formed of hard rubber and comprises an annular wall 12 of uniform thickness preferably centrally provided with an integral web 13 of substantially the same thickness in order to secure perfect balance. However, in the measurement of other liquids, such as petroleum products, this piston would, preferably, be formed of metal.

The base section 10 of the measuring chamber has an upstanding annular boss 14 concentrically formed on its bottom wall, and the upper section of said chamber (not shown) has a similar boss on its top wall. The ends of these bosses are located at opposite sides of the web 13 and out of contact therewith.

The measuring chamber and piston assembly are adapted to be received within a suitable type of outer housing or casing having fluid inlet and outlet pipe connections, such as is shown in the above referred to Whittaker patent. At the center of the piston web 13 upper and lower cylindrical studs 15 and 16, respectively, are secured thereto. The lower stud 16 revolves around a fixed stud 17 fixed to the bottom wall of the base 10 centrally within the boss 14 while the upper stud 15 is adapted to coact with an operating arm on the lower end of the input shaft of a reduction gear train (not shown), which operates a totalizing register mounted on the upper end of the outer housing or casing. Since this gearing and registering mechanism are well known in the art, it is unnecessary to illustrate or further describe the same herein.

A suitable inlet port 18 in the bottom wall of the base section 10 connects the interior of the outer casing or housing with the measuring chamber. A similar inlet port may be correspondingly located in the top wall of the upper section of the measuring chamber. Said top and bottom walls of the measuring chamber, in suitably spaced relation to the inlet port, are provided with recessed portions leading to the outlet port indicated at 19, which is provided in the cylindrical walls of the chamber sections. This depressed or recessed part of the bottom wall of the base section 10 is shown at 20.

The annular wall 12 of the piston 11 is provided with an axially extending slot 21, preferably having relatively wide upper and lower end portions, as shown in Figure 2. Between the inlet and outlet ports 18 and 19 and within the slot 21, the division plate 22 extends radially of the measuring chamber and is suitably fixed at its inner and outer ends with respect to the chamber sections and the piston. As herein shown, the inner end of said plate may be provided with a cylindrical boss 23 carrying a stud or pin 24 which is adapted to be seated in a recess in the upper face of the boss 14 on the bottom wall of the measuring chamber. The outer end of said plate may be fitted within suitably formed recesses in the cylindrical walls of the upper and lower chamber sections at one side of the outlet port 19. As will be noted from reference to Figures 1 and 2, the thickness of the division plate 22 is less than the width of the slot 21 in the wall of the piston 11, and by reason of the piloting or controlling means for the oscillating piston, to be presently described, these edges of the piston wall are always maintained out of contact with the side faces of the division plate.

In the illustrated embodiment of my improved piloting or control means for the oscillating piston, which has been found most practical for the purpose in view, I provide the bottom wall of the base section 10 of the measuring chamber with a horizontal cylindrical bore 25, preferably substantially parallel to the plane of the division plate 22 and located at the same side thereof as the fluid inlet port 18. The outer end of this bore opens through the cylindrical wall of the section 10 of the measuring chamber and a parallel longitudinal slot 26 is formed through the upper side wall of said bore. A reciprocatory guide member 27 is freely movable within the bore 25. This guide member also is preferably of hard rubber and at the upper side thereof and throughout its length is formed with the flat surface 28 which overlaps each side edge of the slot 26. Substantially at the center of this flat surface, the guide member 27 is provided with a diametrical opening 29, the diameter of which is somewhat less than the width of the slot 26. The end of the meter piston wall 12 which overlies the slot 26 is pivotally connected with the reciprocatory guide member 27. Preferably, this connection comprises a pivot pin or stud having a relatively large diameter section 30 splined or otherwise fixed in the bore 31 extending upwardly from the lower face of the meter piston wall 12 in parallel relation to the division plate 22. The section 32 of this pivot pin, having a diameter less than the width of the slot 26, extends downwardly through said slot and has turning or pivotal motion within the opening 29 in the reciprocatory guide member 27.

This construction has numerous advantages. First, in each cycle of oscillatory motion of the meter piston 11, during the reciprocation of the guide member 27, the pivot pin connection 32 has a turning movement through only approximately one-twelfth of a revolution as compared with the two revolutions of the piloting or guiding roller used in prior constructions, while the guide member 27 has substantially four times the bearing surface of said roller. This results in marked reduction in wear and a more accurate and precise control of the oscillatory motion of meter piston 11.

Secondly, the possible entrapment of fluid in the inner end of the bore 25 is prevented by reason of the fact that the surface 28 on the guide member 27 provides a by-pass therefor through which such fluid may flow around the pivot connection 32 and into the outer end of bore 25.

Thirdly, the meter piston and the guide member may be easily and quickly assembled in proper cooperative relation without requiring the independent manipulation of connecting parts.

While the illustrated construction has given satisfactory service and is preferred, it is nevertheless to be understood that if desired the pivot pin might be fixed in the guide member 27 and have turning movement in the wall of the piston 11, and also that the flattened surface 28 of guide member 27 might be located at the bottom or either side thereof. From the foregoing description, it will be appreciated that the piloting or control means, as above described, will efficiently function to assure sustained accurate operation of the oscillating meter piston while maintaining freedom of contact between the confronting edges of the piston wall 12 and the side faces of the division plate 22 of the measuring chamber. As the functional operation of this type of meter to deliver fluid in measured quantities is well understood and sufficiently disclosed in said Whittaker patent, detailed description thereof in the present instance is unnecessary to a proper understanding of the novel features of this invention. My present improvements tend to eliminate the problem of erratic functional operation of the oscillating meter piston due to excessive wear, thereby appreciably lowering maintenance expense in the operation of meters of this type. Also the several parts of my new control means may be cooperatively assembled with greater ease and facility, and, if at any time it should become necessary, the guide member 27 may be readily removed for repair or replacement. As guide member 27 is supported in operative position independently of the meter piston 11, the guide member may be readily removed and replaced in operative connection with the oscillatory piston without much loss of time in the operation of the meter.

It will of course be understood that the web 13 of the oscillatory piston 11 is recessed or cut away in radial alignment with the slot 21, in the manner disclosed in the above identified Whittaker patent. It will therefore be clear from reference to Figure 1 that the guide member 27, during the oscillating motion of the piston 11, effectively prevents contact of the side edges of the slot and the recess with the vertical side faces of the division plate 22. Thus, substantially noiseless, unretarded oscillating motion of the piston 11 relative to said division plate is attained practically throughout the useful life of the meter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter, a measuring chamber and a fluid actuated piston mounted for oscillation therein with respect to an axis, a flow division member in said chamber between inlet and outlet and ports therefor, said piston being slotted to straddle the flow division member, and control means for preventing contact between the flow division member and the oscillating piston during oscillation of the piston comprising a guide member reciprocable along its axis in a direction substantially normal to said axis of oscillation of the oscillating piston, a guideway for said guide member and a pivotal connection between said piston and said guide member.

2. In the fluid meter defined in claim 1, said guideway comprising a longitudinally slotted bore in a wall of said measuring chamber with said pivotal connection extending through the slot in said bore, and said guide member being of smaller lateral cross section than the cross section of said bore to provide a fluid relief passageway between the ends of the bore so that fluid entering into the bore through said slot will not block reciprocation of the guide member.

3. In a fluid meter, a measuring chamber and a piston mounted for oscillation therein, a flow division member in said chamber between inlet and outlet ports therefor, said piston being slotted to straddle said flow division member, means providing an inwardly open recessed slide guideway in said chamber extending substantially parallel to said flow division member, a guide member reciprocable in said guideway and formed on its periphery with a surface region of substantial area adapted for sliding contact with said guideway, and means operatively interconnecting said piston and said guide member comprising a pin perpendicular to the axis of said reciprocable guide member and connecting the piston with the guide member for relative pivotal movement during oscillation of said piston.

4. In a fluid meter having a measuring chamber provided with inlet and outlet ports, a division plate in the chamber between said ports, and an oscillating piston operatively associated with said plate, a guide member mounted on said chamber in a guideway permitting reciprocation of said guide member in the direction of its axis which extends substantially parallel to the division plate and normal to the axis of oscillation of said meter piston, and means operatively connecting the oscillatory piston to said reciprocatory guide member, whereby the reciprocation of the guide member controls the motion of the oscillatory piston in non-contacting relation to said division plate.

5. In the fluid meter defined in claim 4, said guide member being mounted below said meter piston and said connecting means comprises a pivot element substantially normal to the axis of said guide member fixed to said piston and having a separable operative connection with said guide member.

6. In a fluid meter having a measuring chamber provided with inlet and outlet ports, a division plate in the chamber between said ports, and an oscillating piston member operatively associated with said plate; a guide member for said oscillatory piston, said measuring chamber having a bore in its base wall substantially parallel to the plane of the division plate, in which the guide member is supported for reciprocatory movement, and a pivotal connection between the oscillatory piston and the guide member, having its axis substantially perpendicular to the axis of said guide member.

7. The combination defined in claim 6, in which said pivotal connection comprises a pivot pin fixed to the oscillatory piston, and said guide member has a diametrical opening intermediate its ends to removably receive one end of said pin.

8. The combination defined in claim 6, in which said chamber wall has a slot therein substantially parallel to and communicating with said bore to receive said pivotal connection, and said guide member has a longitudinal flattened surface providing a relief passage between the ends of said bore.

9. The combination defined in claim 6, in which said pivotal connection comprises a pivot pin fixed to one of said members, and said chamber wall has a slot therein substantially parallel to and communicating with said bore, said pin having an end portion of less diameter than the width of said slot extending therethrough and connected to the other of said members.

10. The combination defined in claim 6, in which said pivotal connection comprises a pivot pin fixed to said oscillatory piston, and said chamber wall has a slot therein substantially parallel to and communicating with said bore, said pin having an end portion of less diameter than the width of said slot extending therethrough and detachably connected with the guide member.

11. In a fluid meter having a measuring chamber and a fluid pressure operated piston member of the oscillating type therein; means controlling the oscillatory motion of said piston comprising a guide member mounted on the chamber wall with its axis substantially normal to the axis of oscillation of the meter piston, and connecting means between said piston and guide members operative to impart reciprocating motion to the guide member during the oscillating motion of the meter piston.

12. The combination defined in claim 11, wherein said connecting means comprises a part carried by one of said members and detachably engaging the other member for independent assembly of said members with the measuring chamber.

13. The combination defined in claim 11, wherein said connecting means comprises a part carried by the meter piston and having a separable connection with the guide member, and said guide member being removably mounted in a bore in the base wall of the measuring chamber.

CHARLES P. BERGMAN.

REFERENCES CITED

The following references are of record in the file of this patent:

UNITED STATES PATENTS

| Number | Name | Date |
| --- | --- | --- |
| 608,602 | Hill | Aug. 9, 1898 |
| 856,244 | Gamon | June 11, 1907 |
| 1,155,665 | Lambert | Oct. 5, 1915 |
| 1,857,851 | Marden | May 10, 1932 |
| 2,215,873 | Gahm | Sept. 24, 1940 |
| 2,338,152 | Whittaker | Jan. 4, 1944 |